US012579362B2

(12) United States Patent
Baughman et al.

(10) Patent No.: US 12,579,362 B2
(45) Date of Patent: Mar. 17, 2026

(54) AUTOMATED TEXT GENERATION USING ARTIFICIAL INTELLIGENCE TECHNIQUES

(71) Applicant: International Business Machines Corporation, Armonk, NY (US)

(72) Inventors: Aaron K. Baughman, Research Triangle Park, NC (US); Nicholas Michael Wilkin, Seattle, WA (US); Eris Opal Rashon Calhoun, Atlanta, GA (US); Gray Franklin Cannon, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 18/101,290

(22) Filed: Jan. 25, 2023

(65) Prior Publication Data

US 2024/0249183 A1 Jul. 25, 2024

(51) Int. Cl.
G06F 40/279 (2020.01)
G06F 40/10 (2020.01)
G06N 20/00 (2019.01)

(52) U.S. Cl.
CPC ............ G06F 40/279 (2020.01); G06F 40/10 (2020.01); G06N 20/00 (2019.01)

(58) Field of Classification Search
None
See application file for complete search history.

(56) References Cited

U.S. PATENT DOCUMENTS

| | | | |
|---|---|---|---|
| 8,498,930 B2 | 7/2013 | Chung et al. |
| 10,395,216 B2 | 8/2019 | Coffing |
| 10,593,002 B2 | 3/2020 | Palombi et al. |
| 11,127,099 B2 | 9/2021 | Eidelmal et al. |

(Continued)

FOREIGN PATENT DOCUMENTS

| | | |
|---|---|---|
| CN | 104216954 B | 7/2017 |
| CN | 104380146 B | 4/2018 |

OTHER PUBLICATIONS

Genest et al., Framework for Abstractive Summarization using Text-to-Text Generation, Proceedings of the 49th Annual Meeting of the Association for Computational Linguistics, pp. 64-73, Jun. 24, 2011.

(Continued)

*Primary Examiner* — Antim G Shah
(74) *Attorney, Agent, or Firm* — Ryan, Mason & Lewis, LLP

(57) ABSTRACT

Methods, systems, and computer program products for automated text generation using artificial intelligence techniques are provided herein. A computer-implemented method includes simulating, using artificial intelligence techniques, at least one textual description of at least one event related to an input event; identifying historical text sources related to the input event based on processing the at least one simulated textual description; identifying content related to argument theses from at least a portion of the historical text sources; determining at least one measure of alignment between at least a portion of the at least one simulated textual description and at least a portion of the content related to argument theses; and automatically generating text describing the input event based on the at least one measure of alignment.

20 Claims, 4 Drawing Sheets

(56)  References Cited

U.S. PATENT DOCUMENTS

| | | | | |
|---|---|---|---|---|
| 2018/0349476 | A1* | 12/2018 | Carmeli | G06F 16/9537 |
| 2021/0374338 | A1* | 12/2021 | Shrivastava | G06F 40/30 |

OTHER PUBLICATIONS

Buciumas, S. Reinforcement Learning Models for Abstractive Text Summarization, ACM SE '19: Proceedings of the 2019 ACM Southeast Conference, Apr. 2019 pp. 270-271.

Chen et al., Abstractive Snippet Generation, In Proceedings of the Web Conference 2020 (WWW '20), Apr. 20-24, 2020.

Yuan et al., Research on cross-language text similarity calculation, 2015 IEEE 5th International Conference on Electronics Information and Emergency Communication.

Runze et al., Spatial load forecasting based on unstructured information processing and multi-attribute deep learning, 2017 5th International Symposium on Electrical and Electronics Engineering.

Ahuja et al., Language2Pose: Natural Language Grounded Pose Forecasting, 2019 International Conference on 3D Vision (3DV).

Wang et al., Neural Network-Based Abstract Generation for Opinions and Arguments, Jun. 2016.

Kane et al., Prototypical Prospection: Future Events are More Prototypically Represented and Simulated than Past Events, European Journal of Social Psychology, Eur. J. Soc. Psychol. 42, 354-362 (2012).

Huang et al., Distinguishing Past, On-Going, and Future Events: The EventStatus Corpus, Nov. 2016.

IPCOM000270295D, IP.com, Method for Guided Data Exploration in a Multi-Widget Dashboard, Jun. 24, 2022.

Luk et al., IPCOM000264007D, IP.com, Social Listening Advanced Analytics Solution (SOLIAS) for Data Storage Industry, Oct. 30, 2020.

IPCOM000157414D, IP.com, A Method for Relating and Displaying IT Capacity Forecasts with Business Metadata, Aug. 28, 2007.

Mell et al., The NSIT Definition of Cloud Computing, NIST Special Publication 800-145, Sep. 2011.

* cited by examiner

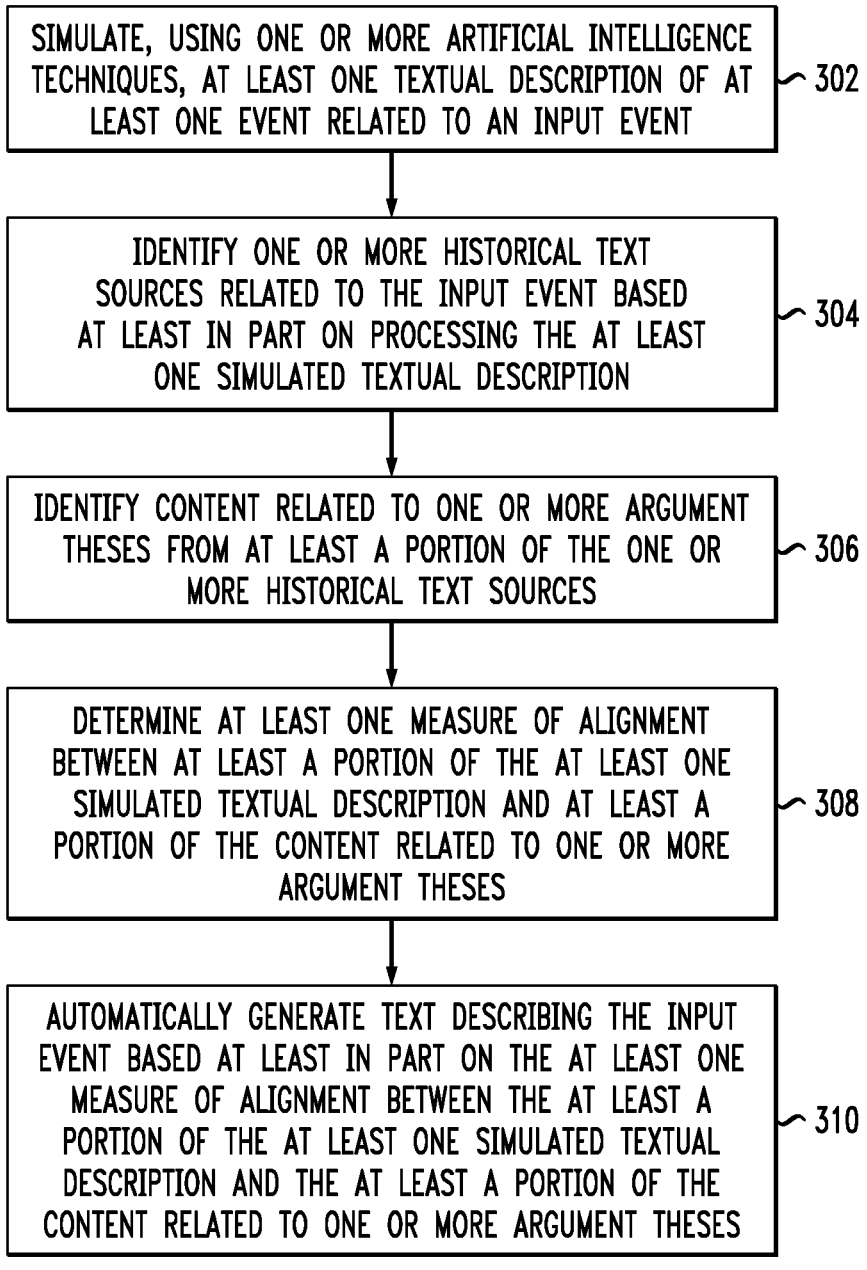

SIMULATE, USING ONE OR MORE ARTIFICIAL INTELLIGENCE TECHNIQUES, AT LEAST ONE TEXTUAL DESCRIPTION OF AT LEAST ONE EVENT RELATED TO AN INPUT EVENT ⌐ 302

IDENTIFY ONE OR MORE HISTORICAL TEXT SOURCES RELATED TO THE INPUT EVENT BASED AT LEAST IN PART ON PROCESSING THE AT LEAST ONE SIMULATED TEXTUAL DESCRIPTION ⌐ 304

IDENTIFY CONTENT RELATED TO ONE OR MORE ARGUMENT THESES FROM AT LEAST A PORTION OF THE ONE OR MORE HISTORICAL TEXT SOURCES ⌐ 306

DETERMINE AT LEAST ONE MEASURE OF ALIGNMENT BETWEEN AT LEAST A PORTION OF THE AT LEAST ONE SIMULATED TEXTUAL DESCRIPTION AND AT LEAST A PORTION OF THE CONTENT RELATED TO ONE OR MORE ARGUMENT THESES ⌐ 308

AUTOMATICALLY GENERATE TEXT DESCRIBING THE INPUT EVENT BASED AT LEAST IN PART ON THE AT LEAST ONE MEASURE OF ALIGNMENT BETWEEN THE AT LEAST A PORTION OF THE AT LEAST ONE SIMULATED TEXTUAL DESCRIPTION AND THE AT LEAST A PORTION OF THE CONTENT RELATED TO ONE OR MORE ARGUMENT THESES ⌐ 310

AUTOMATED TEXT GENERATION USING ARTIFICIAL INTELLIGENCE TECHNIQUES

BACKGROUND

The present application generally relates to information technology and, more particularly, to language processing techniques. More specifically, opinion content is increasingly produced and consumed across various forms of media. However, challenges exist in generating and managing such content.

SUMMARY

In at least one embodiment, techniques for automated text generation using artificial intelligence techniques are provided.

An example computer-implemented method includes simulating, using one or more artificial intelligence techniques, at least one textual description of at least one event related to an input event, and identifying one or more historical text sources related to the input event based at least in part on processing the at least one simulated textual description. The computer-implemented method also includes identifying content related to one or more argument theses from at least a portion of the one or more historical text sources, and determining at least one measure of alignment between at least a portion of the at least one simulated textual description and at least a portion of the content related to one or more argument theses. Additionally, the computer-implemented method includes automatically generating text describing the input event based at least in part on the at least one measure of alignment between the at least a portion of the at least one simulated textual description and the at least a portion of the content related to one or more argument theses.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating a workflow according to an example embodiment of the invention;

FIG. 3 is a flow diagram illustrating techniques according to an example embodiment of the invention.

DETAILED DESCRIPTION

Figure 2:
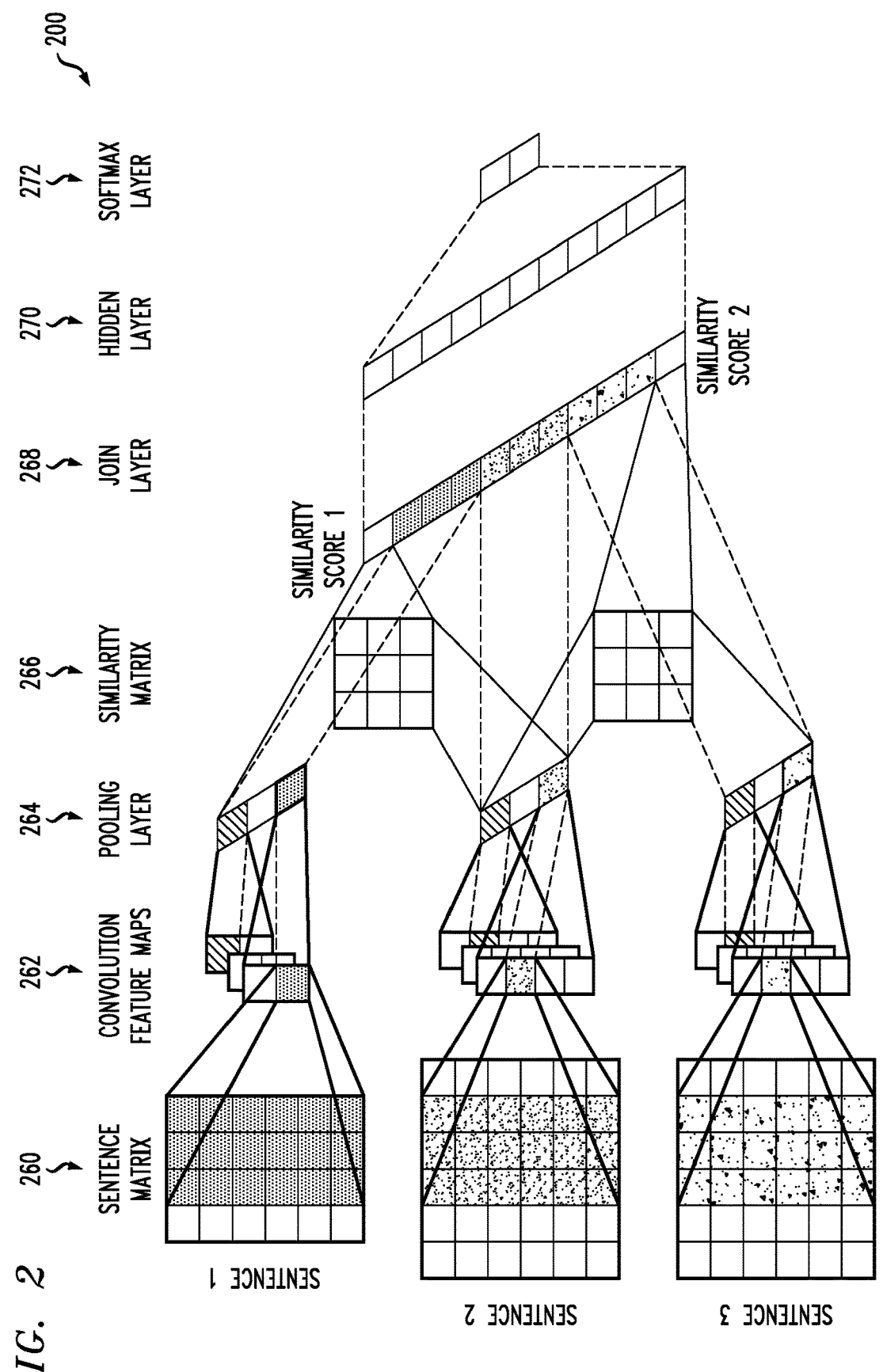
FIG. 2 is a diagram illustrating implementation of an example neural network, according to an example embodiment of the invention.

As described herein, at least one embodiment includes automated abstractive argument discovery and text generation using artificial intelligence techniques and based at least in part on historical data (e.g., data pertaining to related past events) and one or more simulated future events, each related to a given event and/or event type (e.g., a past event or an ongoing event). More specifically, such an embodiment can include simulating at least one event (e.g., simulating the play-by-play results of a sports game), and generating at least one abstractive text summary of the at least one event based at least in part on the data resulting from the simulation. By way merely of example, play-by-play results of a football game can include statistics generated for each player and/or play. As a result, simulating a similar event can include simulating such statistics. Further, one or more embodiments can include applying one or more data-to-text models to produce sentences about the event (e.g., context and/or scene-related information of the event). Such an embodiment can then include using one or more abstractive techniques (e.g., at least one bidirectional encoder representations from transformers-based (BERT-based) model) to summarize the information into one or more new sentences.

One or more embodiments also include extracting one or more themes from at least a portion of the abstractive text summary and querying one or more databases and/or content sources for past opinion-related content (e.g., opinion articles) related to the extracted theme(s). Further, at least one embodiment includes identifying one or more argument theses based at least in part on the past opinion-related content, as well as identifying evidence from at least a portion of the past opinion-related content that supports and refutes the one or more argument theses. In connection with identifying one or more argument theses, past opinion-related content influence the simulation outcome(s). For example, if generators of the past opinion-related content think that PlayerA is going to perform poorly in an upcoming football game, the performance distributions of PlayerA will be carried out based at least in part thereon. Then, as noted above, at least one embodiment can include producing at least one abstractive summarization from the text.

Additionally, one or more embodiments include determining and/or calculating argumentative alignment between passages from the at least one simulation summary and one or more items of evidences identified from the past opinion-related content, wherein such calculations can be performed using one or more text similarity measures (e.g., term frequency-inverse document frequency (TF-IDF)). Such an embodiment can further include generating at least one opinionated abstractive summary relevant to the given event and/or event type using at least a portion of the passages from the at least one simulation summary that aligns with a selected argumentative position. In generating the at least one opinionated abstractive summary, one or more embodiments can include prioritizing sentences and/or arguments created from the simulation. Next, such an embodiment includes prioritizing sentences based at least in part on the alignment of those arguments to selected opinions. Subsequently, in such an embodiment, only a portion (e.g., the top portion) of the prioritized sentences are used for abstractive summarization.

Additionally or alternatively, one or more embodiments can include generating at least one abstractive summary using at least a portion of the passages from the at least one simulation summary that aligns with at least one alternate argumentative position (i.e., at least one argumentative position other than the selected argumentative position).

Accordingly, at least one embodiment includes automatically generating and/or providing foresight into opinions that may develop in reaction to a given event or event category. From produced opinionated summaries (e.g., summaries related to at least one simulated event and one or more past events), content creators can plan content before the given event and/or as the given event unfolds. Such an embodiment includes facilitating quicker production of factually accurate and argumentatively sound opinionated content. Further, in one or more embodiments, through alternating simulation outcomes and argumentative stances, creators can gain understanding into a diversity of possible opinions related to the given event. Based at least in part on this understanding, for example, media entities can reduce conflicts of interest, reduce a loss of audience by preemptively identifying one or more potential opinions and/or positions that its audience may find less appealing.

Figure 1:
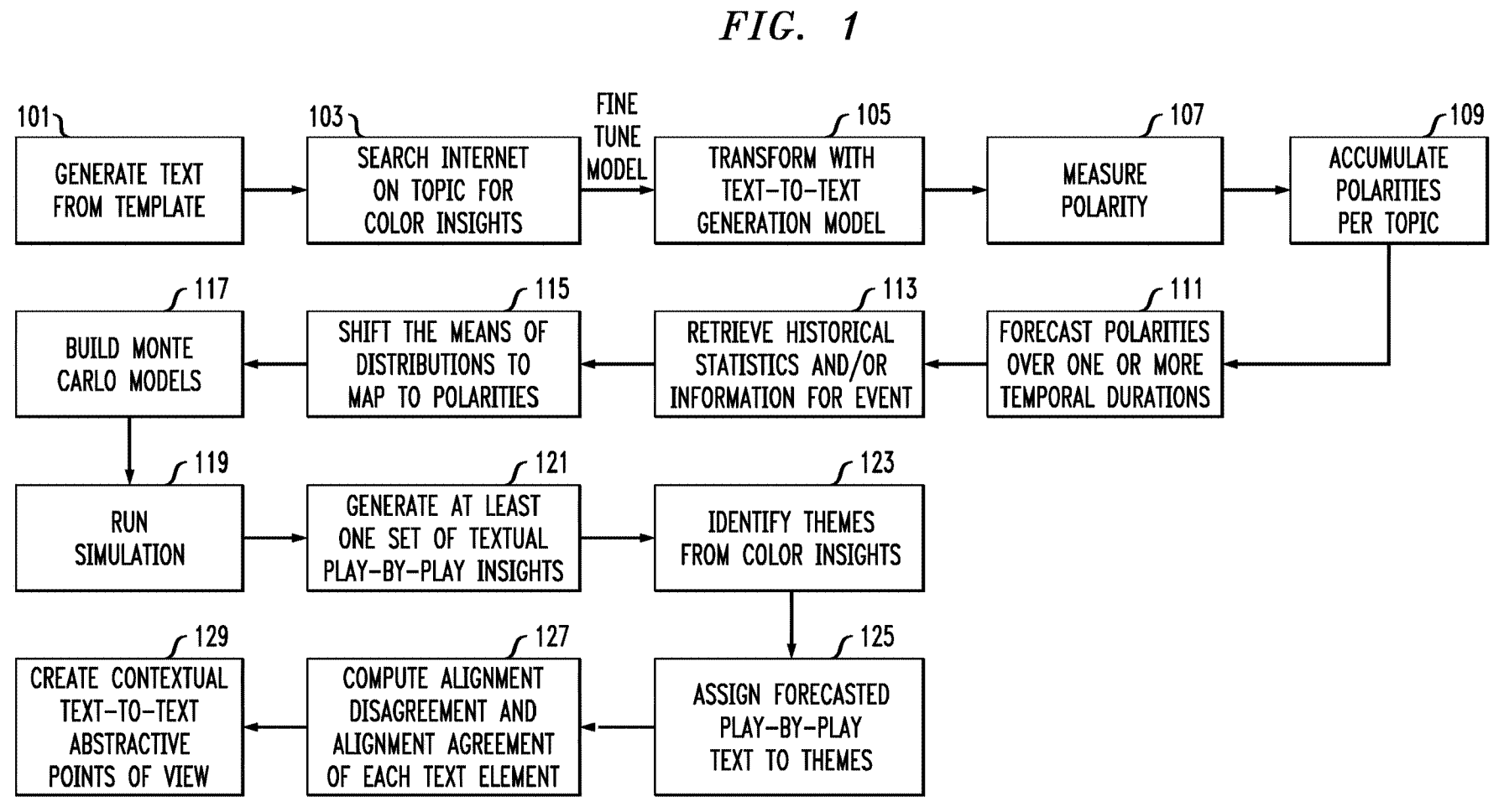

As further described herein (e.g., in connection with FIG. 1), one or more embodiments include determining one or more Monte Carlo simulation distributions, related to a given event and/or event type, from forecasted positional polarities. Such an embodiment can also include creating and/or training one or more context-based text-to-text generation models, and using such one or more models to generate abstractive text (e.g., one or more abstractive text summaries) pertaining to one or more simulated events related to the given event and/or event type. Also, such an embodiment can include calculating parity between past opinion evidence (e.g., previous opinionated content related to the given event and/or event type) and the abstractive text pertaining to the one or more simulated events to generate one or more argumentative positions relevant to the given event and/or event type.

Additionally or alternatively, at least one embodiment can include modifying the one or more Monte Carlo simulation distributions based at least in part on color insights that are likely to produce forecasted factual insights. In such an embodiment, the color insights include factoids derived and/or obtained from one or more Internet sources, wherein such factoids include at least one pro measure or at least one con measure. Such factoids can then influence the mean of the distributions within the simulation.

As used herein, color insights refer to one or more snippets of text that pertain to general and/or broad themes. Further, one or more embodiments can include aligning one or more forecasted factual insights to one or more color insights, and creating one or more positional forecasted narrations related to the given event and/or event type. As used herein, positional refers to a narration that is for or against a given claim. One or more embodiments can include aligning forecasted factual insights that are generated from a simulation to the color insights, which facilitates the prioritization of which insights to use.

Accordingly, and as detailed herein, at least one embodiment of the present invention may provide a beneficial effect such as, for example, facilitating automated production of factually accurate and argumentatively sound opinionated content.

FIG. 1 is a diagram illustrating a workflow according to an example embodiment of the invention. As depicted in FIG. 1, step 101 includes generating text from at least one template (created, for example, by at least one domain expert) related to a given event. Step 103 includes searching, in connection with at least one topic derived from the generated text, the Internet for one or more color insights (e.g., PlayerA performed poorly in a football game because PlayerA threw two interceptions). At least a portion of the one or more color insights are used to train and/or fine-tune a text-to-text generation model, and in step 105, at least a portion of the text generated in step 101 is transformed using the text-to-text generation model. Step 107 includes measuring polarity of the transformed text (e.g., using at least one BERT transformer), step 109 includes accumulating polarities per topic, across multiple topics noted in the transformed text, and step 111 includes forecasting topic polarities over one or more temporal durations. As detailed herein, in one or more embodiments, the accumulated and forecasted polarity values are used to change the means of the distributions within a simulation.

Step 113 includes retrieving historical statistics and/or information for the given event and using at least a portion of such historical statistics and/or information to shift the means of distributions to map to at least a portion of the topic polarities in step 115. Additionally, step 117 includes building and/or training one or more Monte Carlo models based at least in part on the outcome(s) of step 115, and step 119 includes running and/or executing at least one simulation of an event related to the given event using the Monte Carlo model(s). Based at least in part on the results of the at least one simulation, step 121 includes generating at least one set of textual play-by-play insights. As used herein, play-by-play insights refer to snippets of text related to at least one event-related forecast and/or set of event-related statistics. By way of example, if a given embodiment includes running a football game simulation that estimates how many passes PlayerA will throw in the game, such an embodiment can also include creating a sentence such as, for instance, "PlayerA will throw 25 passes for 250 yards and 2 touchdowns."

As also depicted in FIG. 1, step 123 includes identifying one or more themes from the one or more color insights determined and/or identified in connection with step 103, and step 125 includes assigning at least portions of the generated play-by-play insights to at least a portion of the one or more identified themes. Step 127 includes computing alignment disagreement and alignment agreement of each assigned text portion in step 125, and step 129 includes creating one or more contextual text-to-text abstractive points of view based at least in part on the computations of step 127. In at least one embodiment, creating contextual text-to-text abstractive points of view can include teaching at least one text-to-text transformer model how to paraphrase sentences such that a base sentence can be said in multiple different ways.

Figure 4:
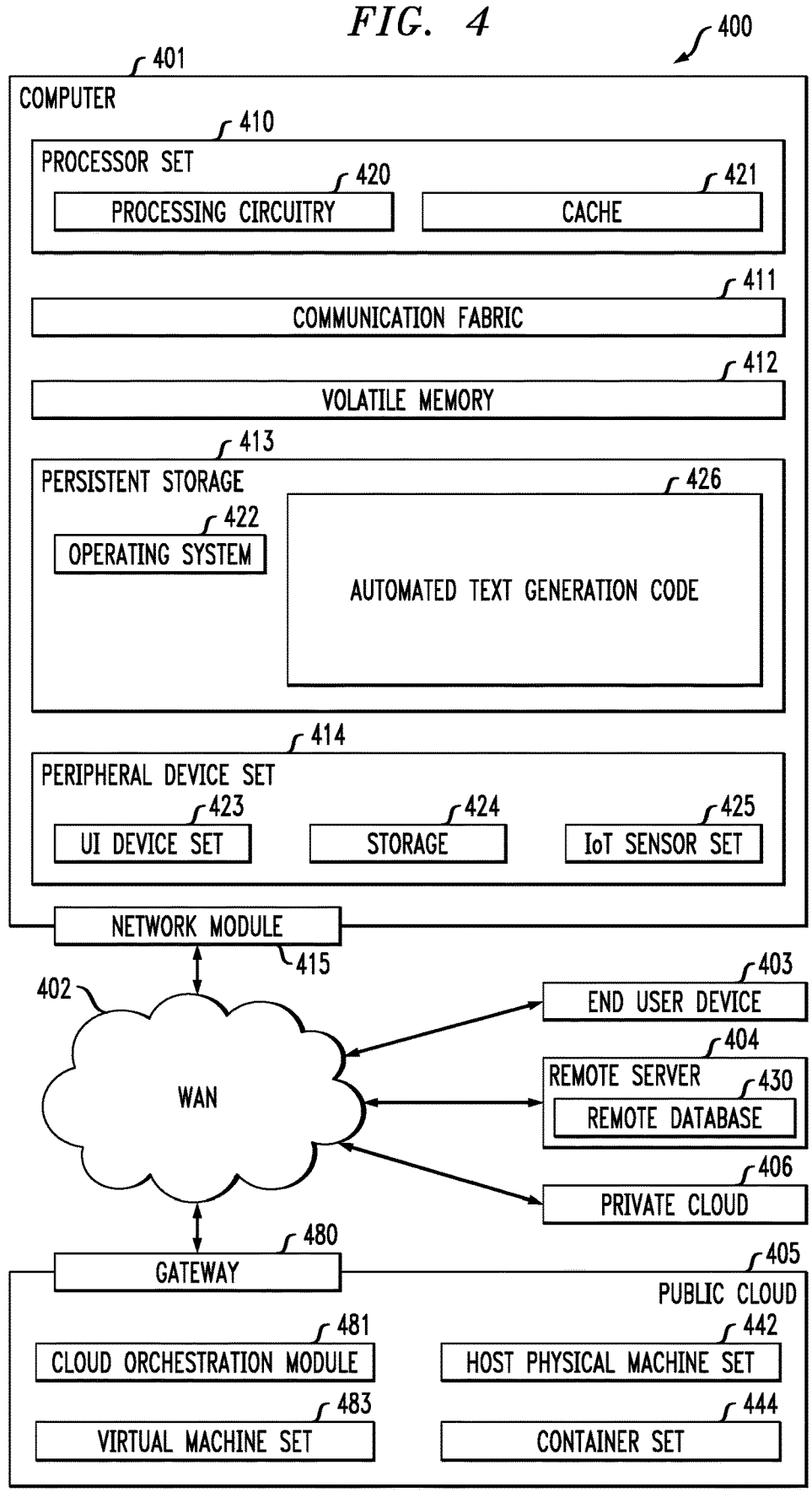
FIG. 4 is a diagram illustrating a computing environment in which at least one embodiment of the invention can be implemented.

FIG. 2 is a diagram illustrating implementation of an example neural network, according to an example embodiment of the invention. In this embodiment, example convolutional neural network 200 is executed by or under the control of at least one processing system and/or device. For example, the example convolutional neural network 200 may be viewed as comprising a portion of a software implementation of at least part of automated text generation code 426 of the FIG. 4 embodiment. More specifically, FIG. 2 depicts an example convolutional neural network 200 which determines similarity between sentences.

By way of further illustration, convolutional neural network 200 includes at least one sentence matrix 260, one or more convolution feature maps 262, at least one pooling layer 264, at least one similarity matrix 266, at least one join layer 268, at least one hidden layer 270, and at least one softmax layer 272. As also depicted in FIG. 2, one or more embodiments include enabling and/or facilitating the use of context sentences in connection with text-to-text techniques, and as illustrated in the FIG. 2 example, Sentence1 and Sentence3 are context sentences that can include color and/or opinion facts around play-by-play insights related to a given event.

FIG. 3 is a flow diagram illustrating techniques according to an embodiment of the present invention. Step 302 includes simulating, using one or more artificial intelligence techniques, at least one textual description of at least one event related to an input event. In at least one embodiment, simulating at least one textual description of the at least one event includes simulating the at least one textual description of the at least one event using one or more text-to-text models. In such an embodiment, the one or more text-to-text models includes at least one a text-to-text transfer transformer. Additionally or alternatively, simulating at least one textual description of the at least one event can include generating at least one abstractive text summary of the at least one event using the one or more artificial intelligence techniques.

Step 304 includes identifying one or more historical text sources related to the input event based at least in part on processing the at least one simulated textual description. In one or more embodiments, identifying one or more historical text sources includes extracting one or more themes from the at least one simulated textual description and querying at least one database containing historical text sources using at least a portion of the one or more themes. Additionally or alternatively, identifying one or more historical text sources can include identifying one or more historical opinionated text sources based at least in part on processing the at least one simulated textual description.

Step 306 includes identifying content related to one or more argument theses from at least a portion of the one or more historical text sources. In at least one embodiment, identifying content related to one or more argument theses from at least a portion of the one or more historical text sources includes identifying at least one of evidence from the one or more historical text sources that supports at least one of the one or more argument theses and evidence from the one or more historical text sources that refutes at least one of the one or more argument theses.

Step 308 includes determining at least one measure of alignment between at least a portion of the at least one simulated textual description and at least a portion of the content related to one or more argument theses.

Step 310 includes automatically generating text describing the input event based at least in part on the at least one measure of alignment between the at least a portion of the at least one simulated textual description and the at least a portion of the content related to one or more argument theses. In at least one embodiment, automatically generating text describing the input event includes automatically generating at least one opinionated abstractive summary of the input event based at least in part on the at least one measure of alignment between the at least a portion of the at least one simulated textual description and the at least a portion of the content related to one or more argument theses. Additionally or alternatively, automatically generating text describing the input event can include automatically generating at least one opinionated abstractive summary of the input event using text from the at least one simulated textual description that aligns with a selected one of the one or more argument theses.

The techniques depicted in FIG. 3 can also include automatically training at least a portion of the one or more artificial intelligence techniques based at least in part on the automatically generated text describing the input event. Also, in one or more embodiments, software implementing the techniques depicted in FIG. 3 can be provided as a service in a cloud environment.

It is to be appreciated that some embodiments described herein utilize one or more artificial intelligence models. It is to be appreciated that the term "model," as used herein, is intended to be broadly construed and may comprise, for example, a set of executable instructions for generating computer-implemented text-based recommendations and/or predictions pertaining to one or more events and/or event types. For example, one or more of the models described herein may be trained to generate recommendations and/or predictions based on historical data pertaining to relevant events and/or data associated with one or more related event simulations, and such recommendations and/or predictions can be used to initiate one or more automated actions (e.g., automatically generating opinionated text related to at least one given event and/or event type).

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as automated text generation code 426. In addition to code 426, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and code 426, as identified above), peripheral device set 414 (including user interface (UI) device set 423, storage 424, and Internet of Things (IOT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/ or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in code 426 in persistent storage 413.

Communication fabric 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type RAM or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a ROM, but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in code 426 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

In computing environment 400, computer 401 is shown as being connected to the internet (see WAN 402). However, in many embodiments of the present invention computer 401 will be isolated from communicating over communications network and not connected to the internet, running as a standalone computer. In these embodiments, network module 415 of computer 401 may not be necessary or even desirable in order to ensure isolation and to prevent external communications coming into computer 401. The standalone computer embodiments are potentially advantageous, at least in some applications of the present invention, because they are typically more secure. In other embodiments, computer 401 is connected to a secure WAN or a secure LAN instead of WAN 402 and/or the internet. In these network connected (that is, not standalone) embodiments, the system designer may want to take appropriate security measures, now known or developed in the future, to reduce the risk that incoming network communications do not cause a security breach.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory configured to store program instructions; and a processor operatively coupled to the memory to execute the program instructions to:
   simulate, using one or more artificial intelligence techniques, at least one textual description of at least one event related to an input event;
   identify one or more historical text sources related to the input event based at least in part on processing the at least one simulated textual description;
   identify content related to one or more argument theses from at least a portion of the one or more historical text sources;
   determine at least one measure of alignment between at least a portion of the at least one simulated textual description and at least a portion of the content related to one or more argument theses; and
   automatically generate text describing the input event based at least in part on the at least one measure of alignment between the at least a portion of the at least one simulated textual description and the at least a portion of the content related to one or more argument theses, wherein automatically generating text describing the input event comprises automatically generating at least one opinionated abstractive summary of the input event based at least in part on the at least one measure of alignment between the at least a portion of the at least one simulated textual description and the at least a portion of the content related to one or more argument theses.

2. The system of claim 1, wherein automatically generating text describing the input event comprises automatically generating at least one opinionated abstractive summary of the input event using text from the at least one simulated textual description that aligns with a selected one of the one or more argument theses.

3. The system of claim 1, wherein simulating at least one textual description of the at least one event comprises simulating the at least one textual description of the at least one event using one or more text-to-text models.

4. The system of claim 3, wherein the one or more text-to-text models comprise at least one a text-to-text transfer transformer.

5. The system of claim 1, wherein simulating at least one textual description of the at least one event comprises generating at least one abstractive text summary of the at least one event using the one or more artificial intelligence techniques.

6. The system of claim 1, wherein identifying one or more historical text sources comprises:
   extracting one or more themes from the at least one simulated textual description; and
   querying at least one database containing historical text sources using at least a portion of the one or more themes.

7. The system of claim 1, wherein identifying one or more historical text sources comprises identifying one or more historical opinionated text sources based at least in part on processing the at least one simulated textual description.

8. The system of claim 1, wherein identifying content related to one or more argument theses from at least a portion of the one or more historical text sources comprises identifying at least one of evidence from the one or more historical text sources that supports at least one of the one or more argument theses and evidence from the one or more historical text sources that refutes at least one of the one or more argument theses.

9. The system of claim 1, wherein the processor is further operatively coupled to the memory to execute the program instructions to:

automatically train at least a portion of the one or more artificial intelligence techniques based at least in part on the automatically generated text describing the input event.

10. A computer program product comprising a computer readable storage medium having program instructions embodied therewith, the program instructions executable by a computing device to cause the computing device to:

simulate, using one or more artificial intelligence techniques, at least one textual description of at least one event related to an input event;

identify one or more historical text sources related to the input event based at least in part on processing the at least one simulated textual description;

identify content related to one or more argument theses from at least a portion of the one or more historical text sources;

determine at least one measure of alignment between at least a portion of the at least one simulated textual description and at least a portion of the content related to one or more argument theses; and automatically generate text describing the input event based at least in part on the at least one measure of alignment between the at least a portion of the at least one simulated textual description and the at least a portion of the content related to one or more argument theses, wherein automatically generating text describing the input event comprises automatically generating at least one opinionated abstractive summary of the input event based at least in part on the at least one measure of alignment between the at least a portion of the at least one simulated textual description and the at least a portion of the content related to one or more argument theses.

11. The computer program product of claim 10, wherein automatically generating text describing the input event comprises automatically generating at least one opinionated abstractive summary of the input event using text from the at least one simulated textual description that aligns with a selected one of the one or more argument theses.

12. The computer program product of claim 10, wherein simulating at least one textual description of the at least one event comprises simulating the at least one textual description of the at least one event using one or more text-to-text models.

13. The computer program product of claim 10, wherein simulating at least one textual description of the at least one event comprises generating at least one abstractive text summary of the at least one event using the one or more artificial intelligence techniques.

14. A computer-implemented method comprising:

simulating, using one or more artificial intelligence techniques, at least one textual description of at least one event related to an input event;

identifying one or more historical text sources related to the input event based at least in part on processing the at least one simulated textual description;

identifying content related to one or more argument theses from at least a portion of the one or more historical text sources;

determining at least one measure of alignment between at least a portion of the at least one simulated textual description and at least a portion of the content related to one or more argument theses; and automatically generating text describing the input event based at least in part on the at least one measure of alignment between the at least a portion of the at least one simulated textual description and the at least a portion of the content related to one or more argument theses, wherein automatically generating text describing the input event comprises automatically generating at least one opinionated abstractive summary of the input event based at least in part on the at least one measure of alignment between the at least a portion of the at least one simulated textual description and the at least a portion of the content related to one or more argument theses;

wherein the method is carried out by at least one computing device.

15. The computer-implemented method of claim 14, wherein automatically generating text describing the input event comprises automatically generating at least one opinionated abstractive summary of the input event using text from the at least one simulated textual description that aligns with a selected one of the one or more argument theses.

16. The computer-implemented method of claim 14, wherein simulating at least one textual description of the at least one event comprises simulating the at least one textual description of the at least one event using one or more text-to-text models.

17. The computer-implemented method of claim 14, wherein software implementing the method is provided as a service in a cloud environment.

18. The computer-implemented method of claim 14, wherein simulating at least one textual description of the at least one event comprises generating at least one abstractive text summary of the at least one event using the one or more artificial intelligence techniques.

19. The computer-implemented method of claim 14, wherein identifying one or more historical text sources comprises:

extracting one or more themes from the at least one simulated textual description; and querying at least one database containing historical text sources using at least a portion of the one or more themes.

20. The computer-implemented method of claim 14, wherein identifying one or more historical text sources comprises identifying one or more historical opinionated text sources based at least in part on processing the at least one simulated textual description.

* * * * *